United States Patent [19]

Roeder et al.

[11] 4,168,055

[45] Sep. 18, 1979

[54] CUTTING TORCH FOR THROUGH CUTTING WORKPIECES

[75] Inventors: Georg Roeder; Helmut Sachs, both of Frankfurt am Main, Fed. Rep. of Germany

[73] Assignee: Messer Griesheim GmbH, Frankfurt am Main, Fed. Rep. of Germany

[21] Appl. No.: 908,647

[22] Filed: May 23, 1978

[30] Foreign Application Priority Data

Jun. 7, 1977 [DE] Fed. Rep. of Germany ....... 2725554

[51] Int. Cl.² ............................................ B23K 37/00
[52] U.S. Cl. ........................................ 266/44; 266/49; 266/74; 148/9 R
[58] Field of Search ................... 148/9 R; 266/44, 48, 266/49, 74, 75

[56] References Cited

U.S. PATENT DOCUMENTS

| 3,880,354 | 4/1975 | Van Horn | 266/74 X |
| 3,934,818 | 1/1976 | Arnold | 148/9 R X |

FOREIGN PATENT DOCUMENTS 2363831  7/1975  Fed. Rep. of Germany ............. 266/49

Primary Examiner—Roy Lake
Assistant Examiner—Paul A. Bell
Attorney, Agent, or Firm—Connolly and Hutz

[57] ABSTRACT

A cutting torch for through cutting workpieces includes a torch stem having its cutting tip directed toward the workpiece with a shielding arrangement attached to the stem for enveloping the cutting area with a mixture of water and compressed air; separate water and air supply lines are each connected to circular canals within the shielding arrangement and nozzles are provided on the underside thereof connected via a through bore to the canals.

16 Claims, 5 Drawing Figures

CUTTING TORCH FOR THROUGH CUTTING WORKPIECES

BACKGROUND OF THE INVENTION

The invention is concerned with a cutting torch for through cutting workpieces, consisting of a troch stem which has a cutting tip at the end directed toward the workpieces, with a shielding arrangement attached to the torch stem out of which there flows a mixture of water and compressed air in the shape of a shield to envelop the cutting area.

Health hazardous gases and dust, especially iron oxide dust result during flame cutting. Two thirds of the iron oxide produced accumulates under the workpiece whereby the remaining third is produced above the workpiece and floats into the air on account of the turbulence existing above the workpiece resulting from the cutting process. In order to avoid these health hazardous effects, it has already been proposed that operating personnel for such a flame cutting machine be supplied with breathing masks or that the machine itself be equipped with a so-called suction attachment. Breathing masks are, disadvantageously irksome to the user, especially after prolonged wear. Suction attachments are expensive to purchase and are thus often not used. Also, the subsequent outfitting of a flame cutting machine with such a suction attachment is extremely expensive and therewith uneconomical.

In order to avoid these disadvantages, it was already proposed (German Patent DT-OS No. 2363831) to mount a shielding arrangement onto the torches of a flame cutting machines. This shielding arrangement, which is mounted on the torch above its cutting tip, is supplied with a water-compressed air mixture which streams out of perforations distributed along the periphery of the arrangement. This compressed air and water mixture which streams out forms a bell-shaped protective wall around the cutting area.

The disadvantage of such a shielding arrangement is, however, that the water droplets formed are too large, so that as a result, the degree of dust binding remains minimal. Furthermore, it is necessary to work with a large amount of water and compressed air throughput per unit time. Beyond this, the droplets which are forming are quite variable in size and, moreover, their distribution is likewise uneven.

SUMMARY OF THE INVENTION

The object of the invention is to provide a sheilding arrangement on a cutting torch with which an optimal binding of the dust or smoke resulting during flame cutting is assured.

In order to accomplish this object, it is proposed according to the invention, that separate supply lines for water and compressed air be associated with the shielding arrangement and that these lines each be connected to a circular canal or passageway inside the arrangement as well as that nozzle be provided at the underside, which are connected, via a through bore, with the compressed air canal as well as with the water canal.

It is provided, according to a preferred embodiment of the invention, that the through bore is designed so as to have several parts, whereby the lower part connects the nozzle with the compressed air canal, the middle part connects the compressed air canal with the water canal and the upper part of the bore which is connected to the water canal is equipped to take up a valve.

As a result of this structure of the shielding arrangement, according to the invention, it is assured that as a result of the atomizing of water, the dust forming above the workpiece as well as the health hazardous smoke gases resulting during flame cutting are bound by this water mist and knocked down.

The quantity of water to be brough forth and atomized per unit time is, thereby, advantageously so small that no pool formation occurs on the workpiece.

It is furthermore provided, according to the invention, that the valve installed in the upper part of the bore is designed as a needle valve, the cone-shaped needle of which engages into the middle part of the bore. It is of further advantage if a valve is associated with each nozzle. By using a needle valve, it is advantageously possible to undertake a fine metering of the water-compressed air mixture such that an effective atomization of the water by the compressed air results. Since a valve is furthermore associated with each nozzle from which the water mist escapes, a partial, individual adjustment of the water mist produced by the shielding arrangement on certain partial areas can be advantageously obtained.

THE DRAWINGS

DETAILED DESCRIPTION

Figure 1:
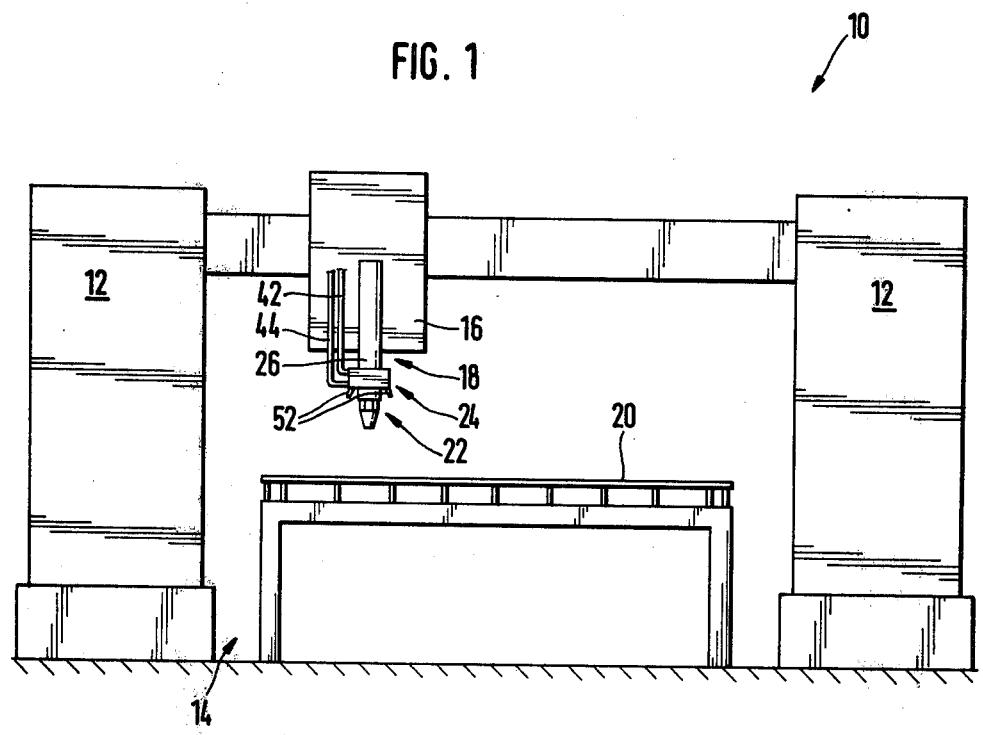
FIG. 1 is a schematic view of a flame cutting machine in accordance with this invention.

A flame cutting machine 10 is illustrated in FIG. 1, which consists of two side carriages 12 as well as a support 14 associated threwith. The flame cutting machine has a torch carriage 16 with a torch 18 attached thereto for cutting a workpiece 20 resting on the support. If desired, and within the framework of the invention, it is also possible to provide more than one torch 18 on the flame cutting machine 10.

As is apparent from the drawings, a shielding arrangement 24 is mounted at the lower end of the cutting torch 18, namely in the area of its nozzle 22.

Figure 2:
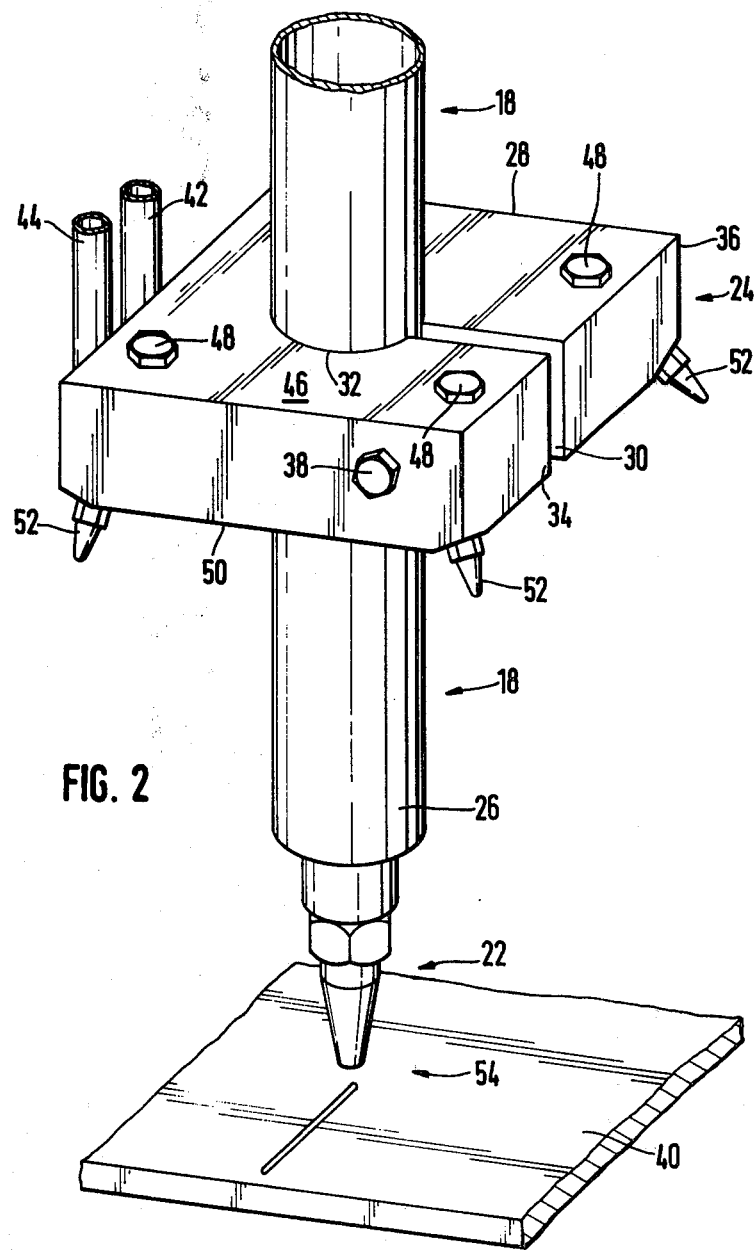
FIG. 2 is an enlarged perspective view of a cutting torch, including the shielding arrangement according to the invention.
Figure 3:
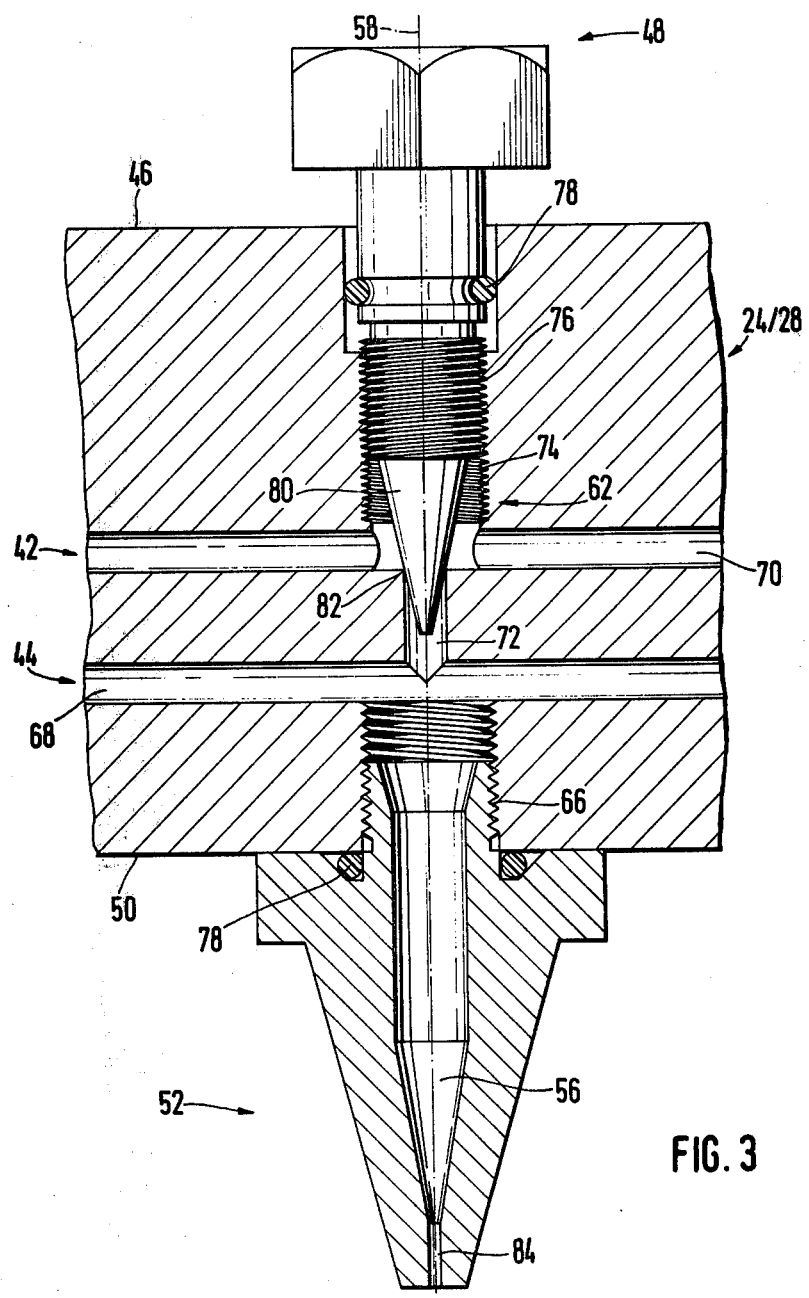
FIG. 3 is a cross-sectional view of the shielding arrangement according to the invention.

This inventive shielding arrangement is detailed with enlarged illustration of FIGS. 2 to 5, especially FIG. 3.

As is particularly apparent from FIG. 2, the shielding arrangement 24 is clamped onto the stem 26 of the cutting torch 18. The shielding arrangement 24 consists, in the illustrated embodiment, of a rectangular housing 28 surrounding the torch stem 26, with arrangement 24 having a longitudinal slit 30 on one side. This longitudinal slit extends up to the central bore 32 of the housing 28 which serves to take up the torch stem 26.

This type of attachment of the shielding arrangement 24 onto the cutting torch makes it possible to adjust the height of the arrangement, quickly and without problems, to the desired distance from the workpiece 40. Two supply lines 42, 44 for water and compressed air, respectively, are provided on the side of the housing 28 away from the longitudinal slit 30. Both of these lines discharge, at different heights, into the housing 28 (see also FIG. 3).

As is further evident from FIG. 2, a valve 48 is installed in each corner area on the upper side 46 of the housing 23. On the side opposite from the valve 48, on the underside 50 of the housing 28, nozzles 52 are provided out of which escapes a water mist, in a manner later described which envelops the cutting area 54.

Figure 4:
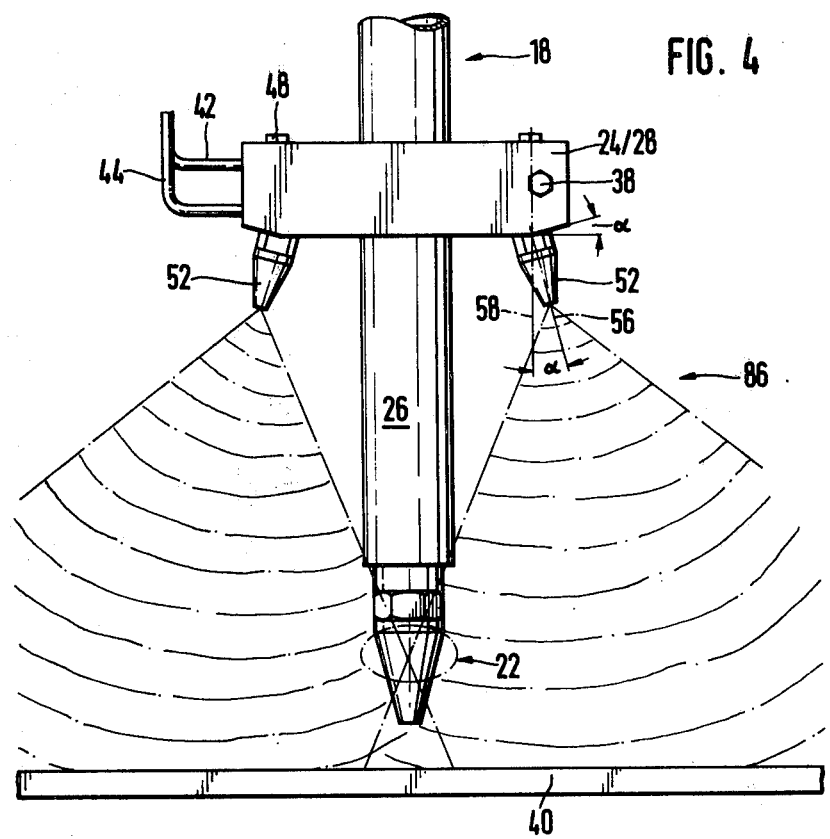
FIG. 4 is a side view similar to FIG. 2 with the shielding arrangement during operation.
Figure 5:
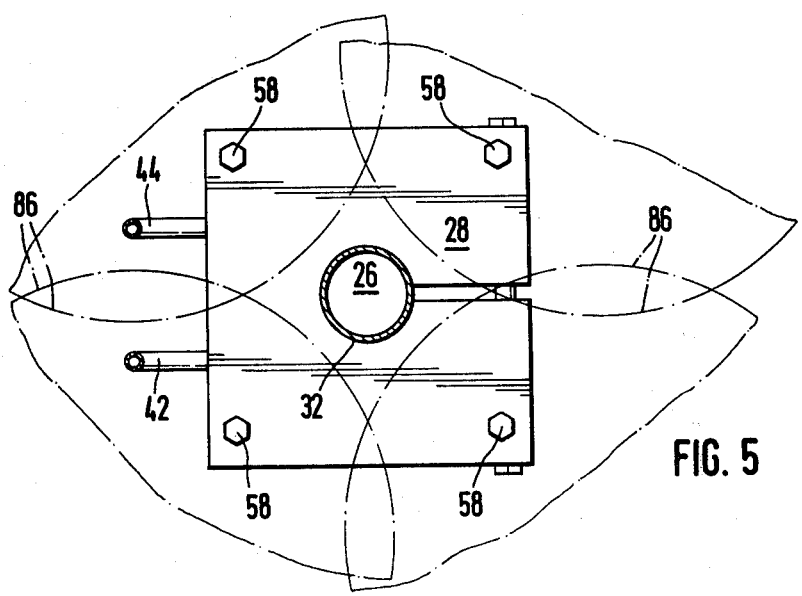
FIG. 5 is a top plan view of FIG. 4 in simplified representation.

As is apparent from FIG. 2 and also from FIG. 4, the area of the underside 50 where the nozzles 52 are mounted is beveled (see the angle α in FIG. 4). This bevel results in an outward orientation of the nozzles 52, whereby their central axis 56 forms the same angle α with the axis 58 of the valve 48.

FIG. 3 illustrates a section of the area of the housing 28 in which the valve 48 as well as the nozzle 52 are provided. As shown therein, the housing 28 has, in each of its corner areas, a through bore 62 which is designed in several parts. The lower part 66 of the bore where the nozzle 52 is screwed in is connected with a first circular canal 68 which is in turn connected to the supply line 44 for the compressed air. Above the first circular canal, a second circular canal 70 is mounted, which is connected with the water supply line 42.

Both circular canals 68, 70 are connected with one another in the areas of the nozzles 52 and/or the valve 48, and namely via the middle bore section 72.

The upper bore section 74 in which the valve 48 is inserted is connected with the circular canal 70. This upper bore section 74, as is the lower bore section 64, is designed so as to be a threaded bore in which the valve 48 is screwed in with its valve body 76. For the purpose of sealing from the atmosphere, an O-ring 78 is provided on the valve body 76. As a result, a gastight sealing of the interior of the housing of the shielding arrangement 24 with respect to the outer atmosphere is assured. The valve body 76 ends in a cone shaped valve needle 80 which projects into the middle bore section 72 of the through bore 62. This middle bore section forms a valve seat with its upper edge 82 which operates in conjunction with the valve needle 80 so that as a result the diameter of the orifice of the connection between both circular canals 68 and 70 (middle bore section 72) is adjustable.

As is evident from FIG. 3, both bore sections 72, 74 are aligned, that is they have a common central axis 58. the lower bore section 66, on the other hand, on account of the obliquely mounted nozzles 52, extends by the same token, in an oblique direction, whereby their central axis is the axis 56 (FIG. 4).

As is apparent from FIG. 2, a separate valve 48 (according to FIG. 3) is associated with each nozzle 52, so that, as a result individual control of the nozzles is possible. The water under a pressure of about 4 bar is channeled to the valves 48 (in example of embodiment 4) via the supply line 42 and by means of the circular line 70.

The circular canal 68, which is connected with the supply line 44 and is arranged exactly below the circular canal 70, is supplied with compressed air, at a pressure of about 2 bar, which flows out of the nozzles 52. When the valve 48 is opened, the water coming from it via the middle bore section 72 is pulled along by the compressed air coming out of the nozzle 52. Since the nozzle outlet 84 is advantageously kept small (nozzle diameter between 0.2 and 0.4 mm), the water pulled along by the compressed air is broken up into the smallest possible droplet (mist) on account of the flow velocity in the nozzle at their point of exit and on account of the resulting expansion in the surrounding atmosphere. By means of the very sensitively operating needle valve 48 (on account of the very minimal pitch of the thread on the valve body 76) it is possible to meter exactly the amount of water to be supplied to the nozzle 52 and one can thus obtain a water output which ranges from a mist to a large droplet water and compressed air mixture. As a result of the advantageous metering possibility for the amount of water which can be supplied to each nozzle, it is possible to equalize manufacturing tolerances, as for example in the making of the nozzle bores or the valve needle 80, by appropriate adjustment of the valve. The amount of water to be put out per unit time is according to the invention variably adjustable so that, as a result, the desired fogging (see hereto, reference numeral 86 in FIG. 4) of the cutting area 54 can be easily attained.

As a result of the mist building up in the shape of a mantle around the cutting area 54, an optimal binding of smoke gases forming during the flame cutting as well as the dust developing thereby, is attained. The amount of water required for such a mist is advantageously minimal. So, for example, as experiments have shown, 7–10 l. of water per hour and 1–1.5 $Nm^3$ of compressed air per hour are needed for the formation of a mist mantle surrounding the cutting area 54, namely, when all four nozzles 52, their nozzle outlet 84 having a diameter of 0.35 mm, are in action.

The atomizing of the water, in other words, its scattering into the smallest possible droplets which appear as a mist to the observe, also results from the fact that a valve 48 is directly associated with the nozzle 52. It is thereby assured that the water released by the valve reaches the nozzle directly and by the shortest path. The reason for this lies mainly in the pressure, quantity and flow relationships in the compressed air canal 68. In this canal, there exists, only in the immediate vicinity of the nozzle 52, a notable flow toward the nozzle outlet 84, as well as a pressure drop. As a result of this, the water released by the valve 48 and flowing out of the bore section 72 is channeled toward the nozzle 52. In order to achieve this, it is necessary, according to the invention, that the cross-sectional area $F_K$ of the compressed canal 68 amount to about eight to twelve times the cross-section area $F_{eD}$ which results from the sum of the cross-sectional areas of all nozzles 52 in the area of their outlet 84. As a result of the thus available volumes in the compressed air canal 68, there results a laminar flow whereby the direction of flow of the water from the middle bore section 72 toward the nozzle 52 is practically undisturbed. On account of the pressure difference between the two media (water: 4 bar; compressed air: 2 bar) a back-up of the compressed air from its canal 68 into the circular canal 70, via the middle bore section 72 is prevented. The atomized water exits, in the form of a cone, from the nozzle 52; see FIG. 4. Depending on the distance of the housing 28 from the workpiece 40, the individual cones of atomized water overlap more or less with one another, as can, for example, be deduced from FIG. 5. An essentially closed circular mist structure (mist matle) is produced in this manner which builds build-up around the cutting tip 22 and therefore around the cutting area 54. Because of this mist mantle 86, as previously mentioned, the smoke gases resulting from flame cutting as well as the dust forming thereby are bound, in a optimal way, and a health hazardous pollution of the surrounding atmosphere is thereby prevented. Because of the extremely sensitive metering of the quantity of water delivered to the nozzles 52 by means of the valve 48 associated with each one of these, it is advantageously possible to obtain water droplets of extremely small dimensions which achieve a good dgree of efficiency, in other words, which assure an optimal binding of the dust.

In order to prevent the atomized water from being knocked down onto the torch stem 26 during the fogging of the cutting area 54, the nozzles 52 are advantageously oriented outwardly as shown by the angle formed by the axes 56 and 58. As a result of this outward orientation of the nozzles 52 (see FIGS. 2 and 4), it is thereby advantageously assured that only the area of the workpiece around the cutting area 54 and not the cutting torch is acted upon.

We claim:

1. In a cutting torch arrangement for through cutting workpieces consisting of a torch stem which has a cutting tip at the end pointing toward the workpiece and with a shielding arrangement attached to the torch stem from which there flows a mixture of water and compressed air in the shape of a shield to envelop the cutting area, the improvement being said shielding arrangement including separate supply lines for water and compressed air leading to the shielding body member, said lines being respectively connected each to a circular canal inside said shielding body member, spray nozzles being secured to the underside of said shielding body member, and a through bore connecting said nozzles to said compressed air canal and to said water canal.

2. Cutting torch arrangement according to claim 1, characterized therein that said through bore includes a plurality of sections including an upper section and a lower section and a middle section, said lower section connecting said nozzles with said compressed air canal, said middle section connecting said compressed air canal with said water canal, and said upper section having a valve therein for communication with said water canal.

3. Cutting torch arrangement according to claim 2, characterized therein that said upper section and said middle section of said bore have a common axis.

4. Cutting torch arrangement according to claim 3, characterized therein that the axis of said lower bore section is inclined with respect to said common axis.

5. Cutting torch arrangement according to claim 2, characterized therein that said valve installed in said upper bore section is a needle valve having a cone shaped needle which engages into said middle bore section.

6. Cutting torch arrangement according to claim 2, characterized therein one of said valves is associated with each of said nozzles.

7. Cutting torch arangement according to claim 1, characterized therein that said underside of said shielding body member is beveled in the area of said nozzles.

8. Cutting torch arrangement according to claim 1, characterized by said nozzles being mounted so that a mantle surrounding the cutting area is formed by the exiting water mist.

9. Cutting torch arrangement according to claim 1, characterized therein that the distance from said nozzles to the workpiece is adjustable.

10. Cutting torch arrangement according to claim 1, characterized therein that each of said nozzles has outlet diameter of 0.2–0.6 mm.

11. Cutting torch arrangement according to claim 10, characterized therein that said diameter is 0.4 mm.

12. Cutting torch arrangement according to claim 1 characterized by the relationship between the cross-section area of the compressed air canal to that of the nozzle outlets being according to the equation $F_K:F_D = 8$ to $12:1$ wherein $F_K$ is the cross-section area of the compressed air canal and $F_D$ is the sum of the cross-section areas of all nozzles in the area of their outlet.

13. Cutting torch arrangement according to claim 12, characterized therein that $F_K:F_D = 10:1$.

14. Cutting torch arrangement according to claim 1, characterized therein that the pressure in the water canal is greater than that in the compressed air canal.

15. In a method of through cutting workpieces with a cutting torch having a torch stem with its cutting tip directed toward the workpiece and with a shielding arrangement attached to the torch stem for directing a mixture of compressed air and water in the shape of a shield which envelopes the cutting area, the improvement being feeding the compressed air and water through separate supply lines to separate circular canals in the body member of the shielding arrangement, and discharging a mixture of compressed air and water from a through bore to outlet nozzles mounted at the underside of the body member with the through bore connecting the nozzles of the canals.

16. In the method of claim 15, including maintaining the pressure in the water canal greater than the pressure in the compressed air canal.

* * * * *